I. I. Robbins.
Revolving Rake.
N° 15777. Patented Sep. 23, 1856.

Witnesses: Henry Howson, William E. Walton
Inventor: Isaac I. Robbins

UNITED STATES PATENT OFFICE.

ISAAC I. ROBBINS, OF PENN'S MANOR, PENNSYLVANIA.

IMPROVEMENT IN HAY-RAKES.

Specification forming part of Letters Patent No. 15,777, dated September 23, 1856.

*To all whom it may concern:*

Be it known that I, ISAAC I. ROBBINS, of Penn's Manor, Bucks county, and State of Pennsylvania, have invented certain new and useful Improvements in Horse-Rakes; and I do hereby declare that the following is a full, clear, and exact description of the same, reference being had to the accompanying drawings, and to the letters of reference marked thereon.

My invention relates to that class of rakes known as "independent toothed horse-rakes;" and it consists in furnishing the ends of the hinged arms with teeth capable of revolving instead of being permanent on the arms, as usual. The revolving teeth are so arranged in connection with sliding wedges or blocks, fully described hereinafter, that the driver may, during the process of raking, so retain the teeth as to prevent them from revolving; and when any obstruction occurs likely to break the teeth, or when it is desirable to remove the collected hay, he may release the teeth, so as to allow them to revolve.

In order to enable others skilled in the art to make and use my invention, I will now proceed to describe its construction and operation.

Figure 1:
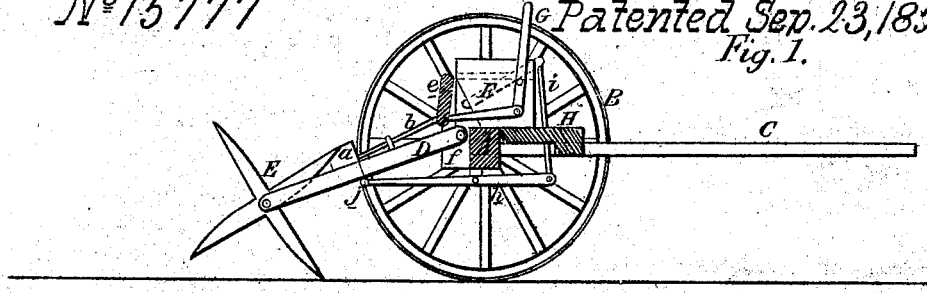
Figure 2:
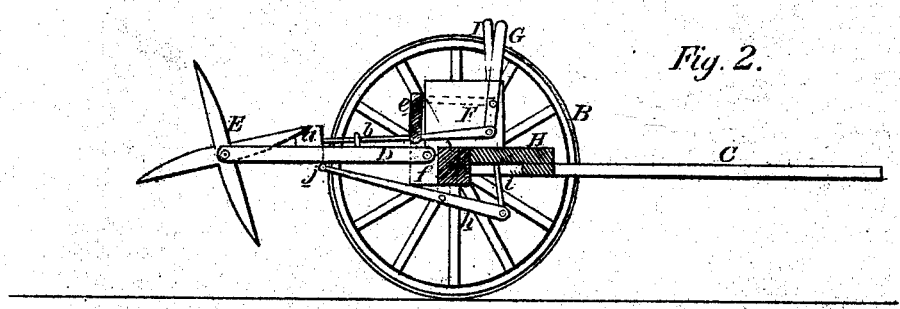
Figure 3:
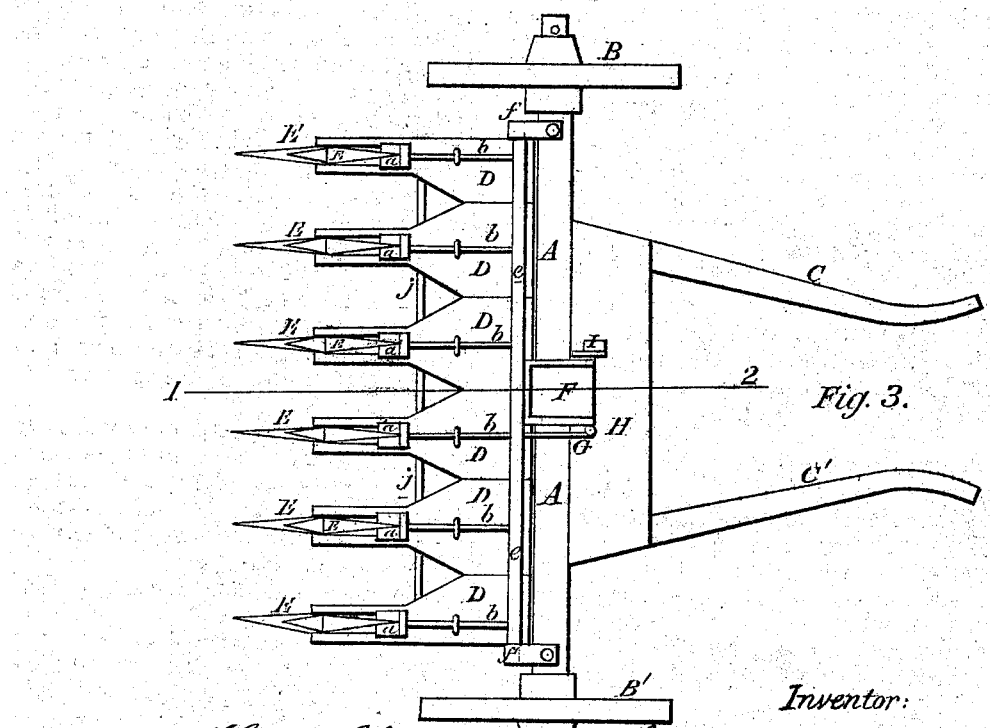

On reference to the drawings which form a part of this specification, Figure 1 is a sectional elevation on the line 1 2, Fig. 3, of my improved horse-rake, showing the teeth in contact with the ground and in the act of collecting the hay; Fig. 2, the same as Fig. 1, but with the teeth removed from the ground; Fig. 3, a ground plan.

The same letters of reference allude to similar parts throughout the several views.

A is the axle-tree, to which are hung the wheels B and B', and to which are secured the shafts C and C', platform H, and driver's seat F.

To the axle-tree A are attached the two brackets *f f'*, and from bracket to bracket extends a rod, to which are hinged the arms D D in such a manner that they may have a radial movement independent of each other. The ends of these arms are forked, and through the ends of the forked portions pass pins on which are hung the revolving teeth E E, each of which consists of three or four arms of suitable material.

On the top of the arms D D, and coinciding with the revolving teeth, are blocks or wedges *a a*. These are connected to rods *b b*, the latter being arranged to slide in the staples in the top of the arms D D, and being connected to the lower edge of the rocking bar *e*, the ends of the latter, near its top edge, being furnished with pins which turn in the brackets *f* and *f'*. Hung on a pin attached to the driver's seat is a lever, G, the lower end of which is jointed to the lower edge of the rocking bar.

On a pin on the opposite side of the driver's seat is hung the lever I, to which is jointed a rod, *i*, which passes through an opening in the platform H, and which is jointed to a lever, *h*, the latter turning on a rod which extends along the under side and nearly the entire length of the axle-tree, the ends of this rod being confined to the latter by staples or other suitable contrivances. The long arm of the lever *h* is connected to the transverse rod *j*, the end of which is connected by bars or levers to the rod underneath the axle-tree.

Operation: When the machine is in full operation, as seen in Fig. 1, the hinged arms D D rest on the horizontal bar J, and the blocks or wedges *a a* have been, by the driver operating the lever G, slided so as to prevent the teeth from turning. Should any obstruction—such as stumps, roots, or stones—which would be likely to break the teeth occur on the surface of the ground, then the driver by operating the lever G in the contrary direction withdraws the blocks *a a* from contact with the teeth, allowing the latter to turn over the ground without causing them injury and without imparting any serious shock to other portions of the machine. When it is desirous to draw the machine over the ground without the teeth being in contact with the same, as seen in Fig. 2, or when the driver wishes to turn the machine, he operates the lever I, and with it the rod *i*, and consequently the lever *h*, so as to cause the horizontal bar to elevate the whole of the hinged arms D D with their teeth E E.

I do not desire to claim exclusively the use of independent teeth for horse-rakes, the same having been described in the patent granted to Calvin Delano, February 7, 1849; neither do I desire to claim the exclusive use of revolving teeth for horse-rakes; but What I do claim, and desire to secure by Letters Patent, is—

The hinged arms D D, with their revolving teeth E E, in combination with the sliding blocks *a a*, the whole being constructed substantially in the manner and for the purpose herein specified.

ISAAC I. ROBBINS.

Witnesses:
HENRY HOWSON,
WILLIAM E. WALTON.